(12) United States Patent
Seo et al.

(10) Patent No.: US 10,697,041 B2
(45) Date of Patent: Jun. 30, 2020

(54) MANUFACTURING METHOD OF CRUDE COPPER FROM LOW-GRADE COPPER SLUDGE

(71) Applicant: SungEel HiMetal, Gunsan-si, Jeollabuk-do (KR)

(72) Inventors: Young-Myoung Seo, Daegu (KR); Kang-Myung Yi, Seoul (KR); Ki-Woong Lee, Hwaseong-si (KR); Suk-Hyun Byun, Gunsan-si (KR); Hyun-Jin Sung, Gunsan-si (KR)

(73) Assignee: SUNGEEL HIMETAL, Gunsan-si (KR)

( * ) Notice: Subject to any disclaimer, the term of this patent is extended or adjusted under 35 U.S.C. 154(b) by 91 days.

(21) Appl. No.: 15/820,992

(22) Filed: Nov. 22, 2017

(65) Prior Publication Data
US 2018/0148812 A1    May 31, 2018

(30) Foreign Application Priority Data

Nov. 25, 2016 (KR) .......................... 10-2016-0158311

(51) Int. Cl.
*C22B 15/00* (2006.01)
*C22B 1/24* (2006.01)
(Continued)

(52) U.S. Cl.
CPC .......... *C22B 15/0039* (2013.01); *C01F 11/18* (2013.01); *C22B 1/24* (2013.01);
(Continued)

(58) Field of Classification Search
CPC .............. C22B 1/24; C22B 1/242–244; C22B 15/0039; C22B 15/0006; C22B 15/0054;
(Continued)

(56) References Cited

U.S. PATENT DOCUMENTS 3,998,624 A * 12/1976 Harris ....................... C21C 5/36
                                                                   75/310
6,013,116 A *  1/2000 Major ....................... C10L 5/10
                                                                   44/551

FOREIGN PATENT DOCUMENTS

CN      102433437 A   *  5/2012
JP      2003-231924 A     8/2003
(Continued)

OTHER PUBLICATIONS

CN 102433437 A. Machine translation. (Year: 2012).*
Kunze, J.; R. Degel & A. Warczok. "Current status and new trends in copper slag cleaning." Copper 2003—Cobre 2003. vol. IV—Pyrometallurgy of Copper (Book 1). The Hermann Schwarze Symposium on Copper Pyrometallugy. Chile. pp. 459-473. (Year : 2003).*

(Continued)

*Primary Examiner* — Tima M. McGuthry-Banks
(74) *Attorney, Agent, or Firm* — Lewis Roca Rothgerber Christie LLP

(57) ABSTRACT

The present invention provides a manufacturing method of crude copper from low-grade copper sludge, one embodiment of the present invention comprises the steps of: (1) calcining a low-grade copper sludge (step 1); (2) producing a mixture by adding at least one selected from a group consisting of binder, flux and combinations thereof to the calcined low-grade copper sludge (step 2); (3) producing a briquette by compression molding the mixture (step 3); (4) melting and reducing by charging the briquette into a submerged arc furnace with adding flux (step 4); and (5) separating crude copper and slag produced by melting and reducing (step 5).

7 Claims, 4 Drawing Sheets

(51) Int. Cl.
  *C22B 1/242* (2006.01)
  *C22B 1/243* (2006.01)
  *C22B 1/244* (2006.01)
  *C01F 11/18* (2006.01)

(52) U.S. Cl.
  CPC .............. *C22B 1/242* (2013.01); *C22B 1/243* (2013.01); *C22B 1/244* (2013.01); *C22B 15/0006* (2013.01); *C22B 15/0054* (2013.01)

(58) Field of Classification Search
  CPC ......... C02F 11/13; C02F 11/18; C02F 11/008; C02F 2101/20; Y02P 10/22
  See application file for complete search history.

(56) References Cited

FOREIGN PATENT DOCUMENTS

| | | | |
|---|---|---|---|
| KR | 10-2007-0036650 A | 4/2007 | |
| KR | 10-1630995 B1 | 6/2016 | |

OTHER PUBLICATIONS

Zhao, B; P. Hayes, E. Jak. "Effects of CaO, Al2O3 and MgO on Liquidus Temperatures of Copper Smelting and Converting Slags under Controlled Oxygen Partial Pressures." J. Min. Metall. Sect. B—Metall. 49(2) pp. 153-159. (Year: 2013).*

Somerville, M et al. "Fluxing Strategies for the Direct to Blister Smelting of High Silica and Low Iron Copper Concentrates." Advances in Molten Slags, Fluxes, and Salts: Proceedings of the 10th International Conference on Molten Slags, Fluxes and Salts (MOLTEN 16) pp. 667-675. (Year: 2016).*

Gurmen, Dr.-Ing. Sebahattin et al. "Slag Systems in Copper Recycling from Cu—Mg Scraps." Slag Systems in Copper Recycling from Cu—Mg Scraps. Proceedings of EMC. pp. 1-12 (Year: 2003).*

CN 102433437 A human translation (Year: 2012).*

J.Q. E et al.; "Chaotic behavior of crude copper composition time series in the process of matte converting and its predicable time scale"; Nonlinear Analysis: Real World Applications; 7; 2006; pp. 651-661.

* cited by examiner

MANUFACTURING METHOD OF CRUDE COPPER FROM LOW-GRADE COPPER SLUDGE

CROSS-REFERENCE TO RELATED APPLICATION

This application claims priority to Korean Patent Application No. 10-2016-0158311 filed on Nov. 25, 2016 and all the benefits accruing therefrom under 35 U.S.C. § 119, the contents of which is incorporated by reference in its entirety.

BACKGROUND OF THE INVENTION

1. Field of the Invention

The present invention relates to a manufacturing method of crude copper from low-grade copper sludge and more particularly to a method for manufacturing crude copper from low-grade copper sludge comprising calcining a low-grade copper sludge, adding binder and/or flux, and melting and reducing through a submerged arc furnace.

2. Description of the Related Art

Although about 70,000 tons of copper-containing sludge is produced annually in a processing of printed circuit boards (PCBs), etching, and electroplating processes. Only some high-grade sludge (copper content greater than 25 wt %) is recycled at some large smelters using a dry smelting process. However, low grade copper sludge having a copper content of less than 25 wt % is largely sold or buried abroad, which causes resource leakage and environmental pollution.

Korean Patent Publication No. 10-2007-0036650 discloses a method for treating scrap and/or sludge containing copper and precious metal. Concretely, flammable copper which has been crushed to a particle diameter of 10 mm or less, noble metal scrap is blown from a tuyere of a cupola together with non-flammable copper, noble metal scrap and solvent in a particle size of 3 mm or less. And copper and precious metal scrap, which is nonflammables treated with a particle size of 30 to 50 mm, is introduced from a raw material inlet of the upper part of the cupola together with a solvent and coke. And then it is separated into black copper, pig iron, slag and dust mainly containing copper by a melting and reducing treatment in a cupola.

On the other hand, the Submerged Arc Furnace (SAF) process is a method in which a carbon electrode rod is immersed in a molten metal to melt a raw material by resistance heat of an input raw material, unlike the arc electric furnace used in existing steelmaking processes. It is an electric furnace suitable for the treatment of raw materials such as low-grade copper sludge because it is small in size and energy consumption compared to dry smelting furnace of existing large smelter.

However, if the low-grade copper sludge is injected directly through the submerged arc furnace without any pretreatment process, loss of fume and dust is generated. It is possible to cause damage to furnace refractories due to organic matter in the sludge, and additional processing may be needed to remove moisture due to a large amount of moisture in the sludge. In other words, there is a need for measures to overcome the limitations of low-grade copper sludge treatment by a conventional wet smelting process alone.

As a relative prior art, there is a scrap and/or sludge treatment method containing copper, precious metals disclosed in Korean Patent Publication No. 10-2007-0036650 (published on Apr. 3, 2007).

SUMMARY OF THE INVENTION

The present disclosure is directed to providing a manufacturing method of crude copper from low-grade copper sludge having a copper content in range of 5 wt % to 25 wt % by treating the low grade copper sludge with copper content of 5 wt % to 25 wt % by using the submerged arc furnace, and it is possible to overcome the limitations in treating the copper sludge with the conventional wet smelting process alone.

It is a further object of the present disclosure is directed to providing a manufacturing method of crude copper from low-grade copper sludge for minimizing the loss of fumes and dust, preventing damage to furnace refractories due to organic matter in the sludge, and requiring an additional process to remove moisture from a large amount of moisture in the sludge.

The details of other embodiments are included in the 'detailed description of the invention' and the accompanying drawings.

The advantages and/or features of the present invention and the manner of achieving them will become apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

In an aspect of the present invention, it is possible to provide a manufacturing method of crude copper from low-grade copper sludge, including the steps of: calcining a low-grade copper sludge (step 1); producing a mixture by adding at least one selected from a group consisting of binder, flux and combinations thereof to the calcined low-grade copper sludge (step 2); producing a briquette by compression molding the mixture (step 3); melting and reducing by charging the briquette into a submerged arc furnace with adding flux (step 4); and separating crude copper and slag produced by melting and reducing (step 5).

In addition, according to a preferred embodiment of the present invention, the low-grade copper sludge of the step 1 may have a copper content in range of 5 wt % to 25 wt %.

In addition, according to a preferred embodiment of the present invention, the calcining temperature in step 1 may be in range of 350° C. to 550° C.

In addition, according to a preferred embodiment of the present invention, the binder in step 2 may include one selected from a group consisting of molasses, starch, bentonite, water glass, and combinations thereof.

In addition, according to a preferred embodiment of the present invention, the flux of step 2 and step 4 may include one selected from a group consisting of calcium oxide, silica, and combinations thereof.

In addition, according to a preferred embodiment of the present invention, the addition of step 2 may be carried out so that the weight ratio of the copper sludge to the binder may be in range of 100:1 to 10.

In addition, according to a preferred embodiment of the present invention, the mixture of step 2 may further comprise water, and the weight ratio of the copper sludge to water may be in range of 100:1 and 10.

In addition, according to a preferred embodiment of the present invention, the low-grade copper sludge of step 1 may include iron, and the flux of step 4 may include silica and calcium oxide, and the flux is added so as to form a slag including, iron oxide (FeO) in range of 40 wt % to 57 wt %; silica (SiO2) in range of 33 wt % to 37 wt %; and calcium oxide (CaO) in range of 10 wt % to 23 wt %.

In addition, according to a preferred embodiment of the present invention, melting and reducing in step 4 may be performed at the temperature of 1300° C. to 1500° C.

In another aspect of the present invention, it is possible to provide the crude copper includes copper in range of 97 wt % to 99 wt %, manufactured by the method.

Other details of preferred embodiments of the present invention are included in the detailed description and the attached drawings.

The advantages and/or features of the present invention and the manner of achieving them will be apparent from and elucidated with reference to the embodiments described hereinafter with reference to the accompanying drawings.

However, it should be understood that the present invention is not limited to the embodiments described below, but may be embodied in many different forms and should not be construed as limited to the embodiments set forth herein. And it should be understood that the invention is only defined by the scope of the respective claims.

According to the exemplary embodiment of the present invention, a low-grade copper sludge having a copper content in range of 5 wt % to 25 wt % may be treated by using a submerged arc furnace, and it is possible to overcome the limitations in treating the copper sludge with a conventional wet smelting process alone.

According to the exemplary embodiment of the present invention, the loss of fume and dust can be minimized when the briquette made from low grade sludge may be melted and reduced through the submerged arc furnace, and it is possible to prevent damage to furnace refractories due to organic matter in the sludge, and an additional process for removing moisture may not be required due to a large amount of moisture in the sludge.

It should be understood that the effects of the present invention are not limited to the effects described above, but include all effects that can be deduced from the detailed description of the present invention or the constitution of the invention described in the claims.

DETAILED DESCRIPTION OF THE INVENTION

Figure 1:
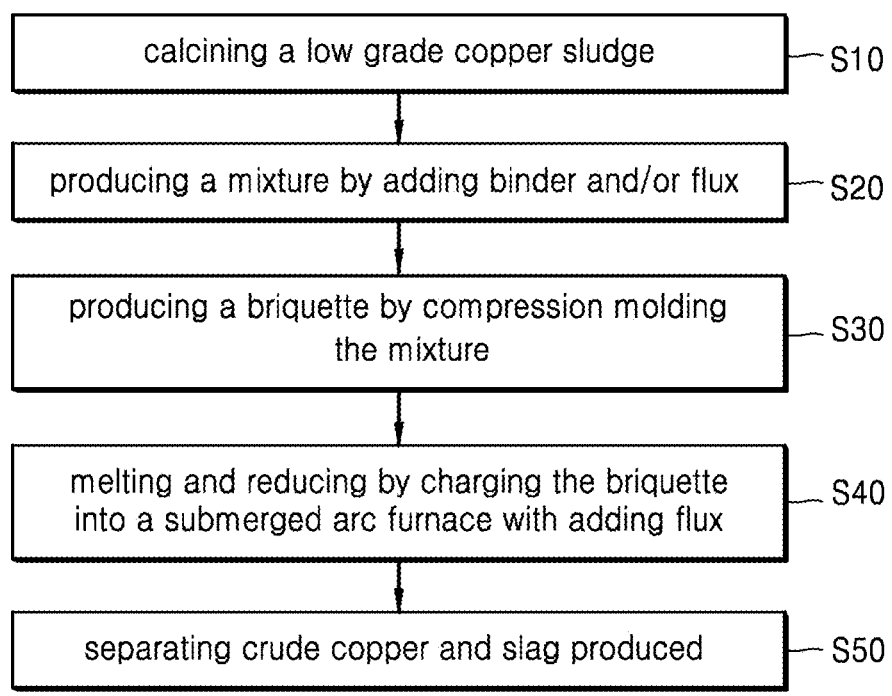
FIG. 1 is a schematic view showing an example of a manufacturing method of crude copper from low-grade copper sludge according to an embodiment of the present invention.
Figure 2:
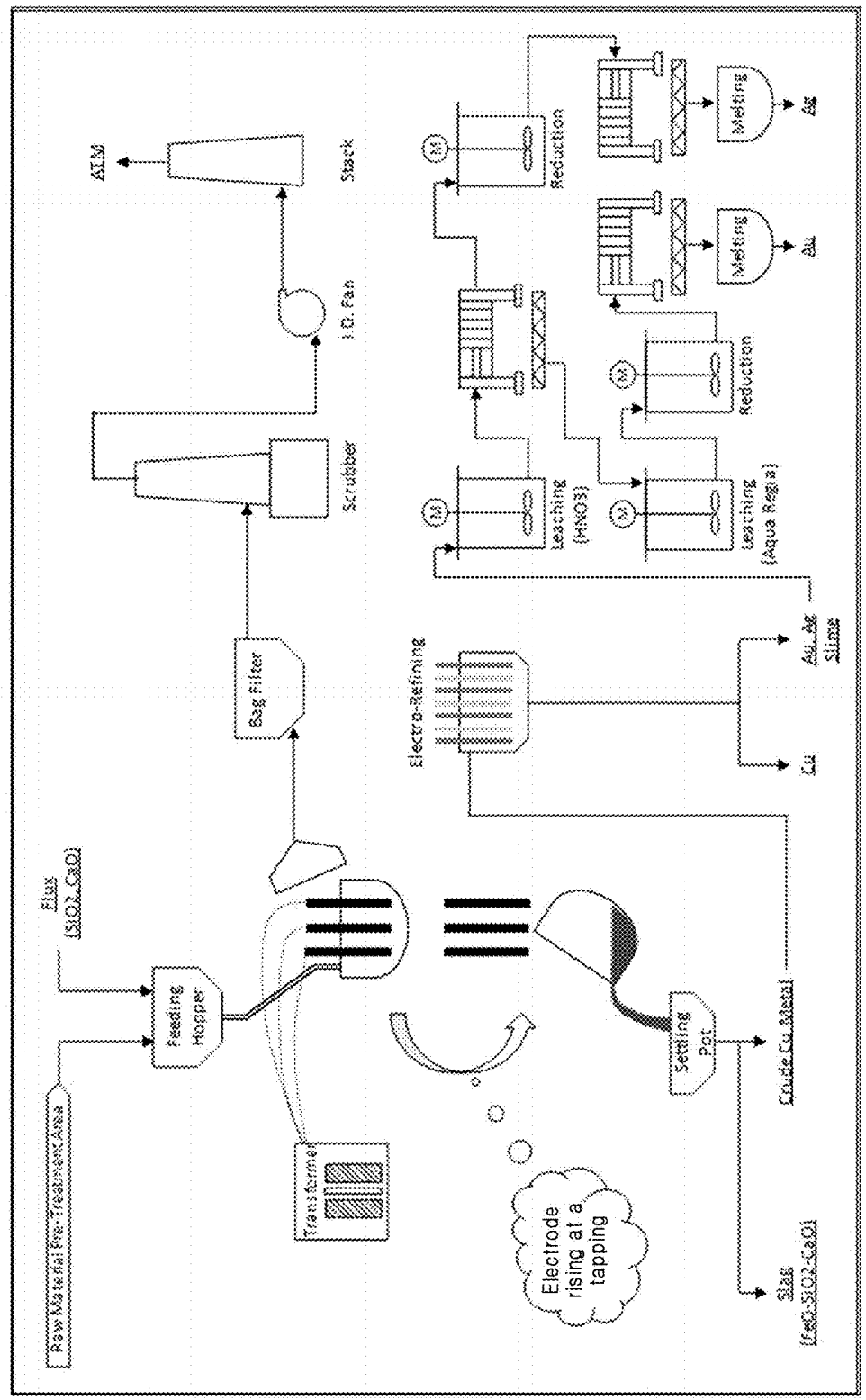
FIG. 2 is a schematic view showing another example of a manufacturing method of crude copper from low-grade copper sludge according to an embodiment of the present invention.
Figure 3:
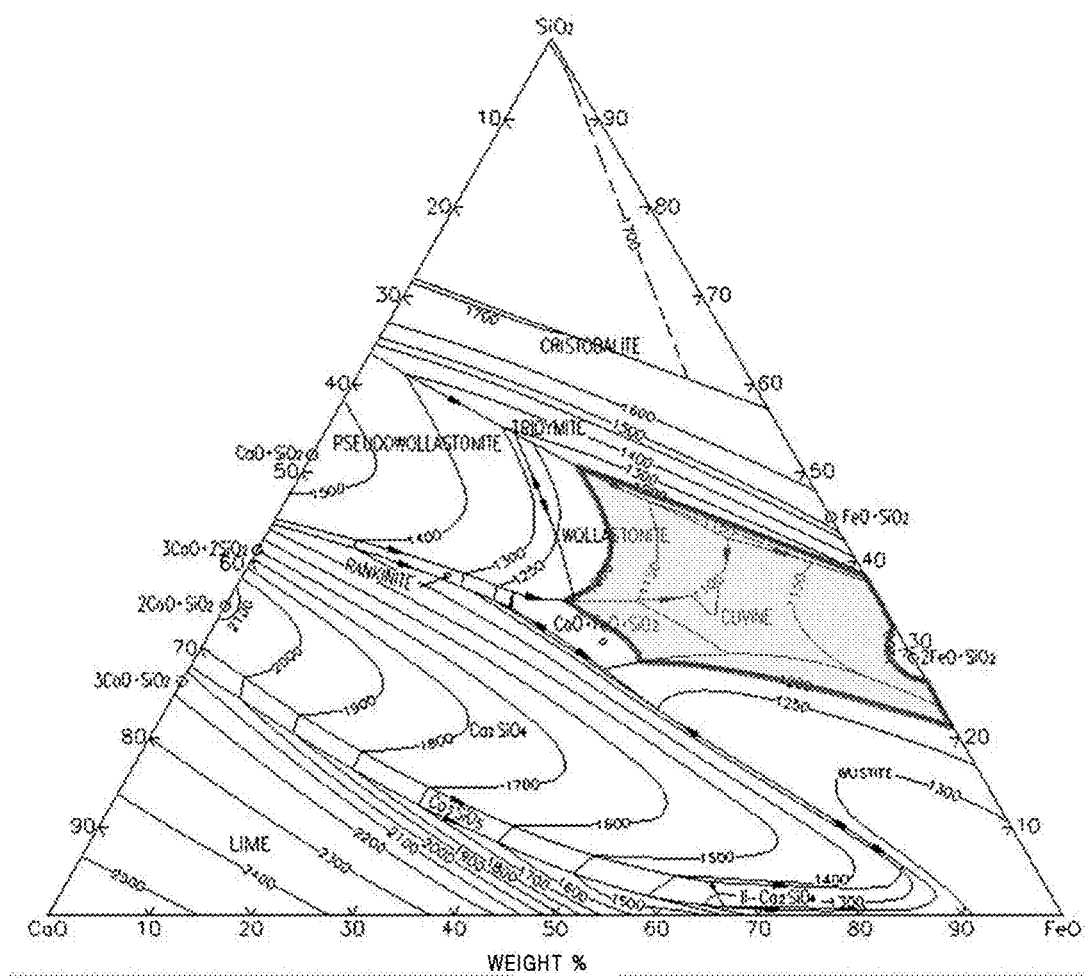
FIG. 3 is a ternary system diagram showing a slag composition in a submerged arc furnace of a manufacturing method of crude copper from low-grade copper sludge according to an embodiment of the present invention.

Hereinafter, an exemplary embodiment of the present invention will be described in detail with reference to accompanying drawings.

Before describing the present invention in detail, terms and words used herein should not be construed in an ordinary or dictionary sense and should not be construed as limiting the invention to the inventors of the present invention in the best way possible, and it is to be understood that the concepts of various terms can be properly defined and used, and further, these terms and words should be construed as meaning and concept consistent with the technical idea of the present invention.

That is, the terms used herein are used only to describe preferred embodiments of the present invention, and are not intended to specifically limit the contents of the present invention, and it should be noted that this is a defined term considering that many possibilities of the present invention.

Also, in this specification, the singular forms "a", "an", and "the" include plural referents unless the context clearly dictates otherwise, and similarly it should be understood that even if they are expressed in plural they may include singular meaning.

Where a component is referred to as "comprising" another component throughout this specification, unless specified otherwise, this means the component does not exclude any other element but may further include any other element.

Further, when it is stated that an element is "inside or connected to another element", this element may be directly connected to another element or may be installed in contact with it, or may be installed spaced apart with a predetermined distance, and in the case where a component is installed to be spaced apart with a predetermined distance, a third component or means for fixing or connecting the component to another component may be present, and it should be noted that the description of the third component or means may be omitted.

In addition, in this specification, the same reference numerals are used for the respective constituent elements of the drawings, and the same constituent elements are denoted by the same reference numerals even if they are shown in different drawings, that is, the same reference numerals indicate the same components throughout this specification.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

According to an aspect of the present invention, it produced a manufacturing method of crude copper from low-grade copper sludge, comprising in the steps of, (Step 1) calcining a low-grade copper sludge in step of S10;
(step 2) producing a mixture by adding at least one selected from a group consisting of binder, flux and combinations thereof to the calcined low-grade copper sludge in step of S20;
(step 3) producing a briquette by compression molding the mixture in step of S30;
(Step 4) melting and reducing by charging the briquette into a submerged arc furnace with adding flux in step of S40; and
(step 5) separating crude copper and slag produced by melting and reducing in step of S50.

Hereinafter, a manufacturing method of crude copper from low-grade copper sludge according to one aspect of the present invention will be described in detail for each step.

According to an aspect of the present invention, there is provided a manufacturing method of a crude copper from a low-grade copper sludge, wherein the step 1 include the step of calcining a low-grade copper sludge (S10).

A low-grade copper sludge of step 1 may have a copper content of 5 wt % to 25 wt %, preferably 5 wt % to 21 wt %.

The calcining temperature of the step 1 may be a 350° C. to 550° C., may preferably be 400° C. to 500° C. If the calcining temperature is less than 350° C., there is a possibility that the organic matter that may be contained in the low-grade copper sludge may not be effectively removed. If the calcining temperature is higher than 550° C., excessive energy may be wasted in the removal if the organic matter that may be contained in the low-grade copper sludge.

The calcining time of the step 1 may be in range of 1 hour to 4 hours, preferably in range of 2 hours to 3 hours. If the calcining time is less than 1 hour, the problems may occur in which organic matter remains in the calcined low-grade copper sludge. If the calcining time exceeds 4 hours, excessive energy may be wasted in the removal if the organic matter that may be contained in the low-grade copper sludge.

Through the calcining in the step 1, a low-grade copper sludge containing copper content increased by 40% to 60% relative to the copper content (wt %) of the low grade copper sludge before calcining can be obtained. Concretely, when the copper sludge having a copper content of 20 wt % is calcined through the method, a low-grade copper sludge containing 30 wt % of copper can be obtained.

According to an aspect of the present invention, there is provided a manufacturing method of crude copper from low-grade copper sludge, wherein a step of producing a mixture by adding at least one selected from a group consisting of binder, flux and combinations thereof to the calcined low-grade copper sludge (S20).

The binder of step 2 may include one selected from a group consisting of molasses, starch, bentonite, water glass, and combinations thereof, and preferably binder including bentonite or water glass can be used.

The flux of step 2 may include one selected from a group consisting of calcium oxide, silica, and combinations thereof.

The addition of the step 2 may be carried out so that the weight ratio of the sludge to the binder is 100:1 to 10, preferably the weight ratio of the sludge to the binder is 100:3 to 7. If the weight ratio of the copper sludge to the binder is less than 100:1, a problem may occur that compression molding may not be effectively performed in the following step. If the weight ratio of the copper sludge to the binder is more than 100:10, a problem may occur that the manufacturing cost rise. When a produced briquette was charged into a submerged arc furnace with melting and reducing, the cost of energy consumption per unit weight of raw material of copper sludge may be increased, and there may be a problem of a decrease in the amount of raw material input relative to an increase in binder usage during producing a briquette.

The mixture of step 2 further includes water and the weight ratio of the copper sludge to water is in range of 100:1 to 10, preferably the weight ratio of the copper sludge to water is 100:3 to 7. By including water in the above-mentioned range, it is possible to improve formability in compression molding in the following step.

Stirring can be performed after adding binder and flux in step 2, and it can be carried out through a ribbon mixer which is mixed by a spiral impeller. The stirring may be performed for 0.5 to 3 hours, preferably for 1 to 1.5 hours. If the stirring is performed for less than 0.5 hour, there is a possibility that the low-grade copper sludge, binder, flux and the like are not mixed uniformly. If the stirring is performed for more than 3 hours, excessive energy waste may occur in mixing of the low-grade copper sludge, binder, flux, and the like uniformly.

According to an aspect of the present invention, there is provided a manufacturing method of crude copper from low-grade copper sludge, wherein the step 3 includes producing a briquette by compression molding the mixture (S30).

The compression molding of step 3 can be carried out thereby the mixture prepared in step 2 is passed between two rollers with predetermined separation.

According to an aspect of the present invention, there is provided a manufacturing method of crude copper from low-grade copper sludge, the method may further include a step of drying naturally the low-grade copper sludge briquette compressed and molded.

According to an aspect of the present invention, there is provided a manufacturing method of crude copper from low-grade copper sludge, wherein the step 4 includes melting and reducing by charging the briquette into a submerged arc furnace with adding flux (S40).

The flux of step 4 may include one selected from a group consisting of calcium oxide, silica, and combinations thereof. At this time, the low-grade copper sludge in step 1 includes iron, wherein the flux is added so as to form a slag including, iron oxide (FeO) in range of 40 wt % to 57 wt %;
silica ($SiO_2$) in range of 33 wt % to 37 wt %; and
calcium oxide (CaO) in range of 10 wt % to 23 wt %.

The slag having the above composition may have a melting point of 1300° C. or lower and can be effectively melted at the submerged arc furnace operating temperature, which is described later.

The melting and reducing in step 4 may be performed at the temperature of 1300° C. to 1500° C., preferably at a temperature of 1350° C. to 1450° C. If the temperature during melting and reducing of step 4 is lower than 1300° C., there is a possibility that a produced slag may not be melted at all. And if the temperature during melting and reducing of step 4 is performed at higher than 1500° C., excessive energy wastage may occur in producing the crude copper from the briquette produced in step 3.

According to an aspect of the present invention, there is provided a manufacturing method of crude copper from low-grade copper sludge, wherein the step 5 includes separating crude copper and slag produced by melting and reducing (S50).

The separation of the step 5 may be performed by skimming a molten copper and a molten slag due to the difference of the specific gravity during melting and reducing in step 4.

According to an exemplary embodiment of the present invention, it is possible to provide a crude copper manufactured by the method (Steps 1 to 5, S10 to S50), and which includes copper in range of 97 wt % to 99 wt %.

The crude copper prepared by the method may contain 200 ppm to 300 ppm of gold.

The crude copper prepared by the method may contain 2000 ppm to 3000 ppm of silver.

The crude copper produced by the method can be obtained by a wet smelting process to obtain a slime comprising copper and valuable metals (such as gold, silver, palladium, or platinum), and a slime may be separated by a wet leaching process.

The step of manufacturing a briquette from a low-grade copper sludge according to the step 1 to 3 may be performed by a low-grade copper sludge briquette production apparatus 100 which includes, a low grade copper sludge feeding hopper 11;

a rotary calcining furnace 21 for calcining the material discharged from a low grade copper sludge feeding hopper 11;

a ribbon mixer 41 for stirring the material discharged from a binder feeding hopper 12; a flux feeding hopper 13; and the rotary calcining furnace 21; and a compression portion 51 for compression molding the material discharged from the ribbon mixer 41.

Hereinafter, a low-grade copper sludge briquette production apparatus 100 will be described with reference to FIG. 4.

The low-grade copper sludge briquette production apparatus 100 further includes a screw conveyor 31 for transferring a discharged material from the binder feeding hopper 12, the flux feeding hopper 13, and the rotary calcining furnace 21, and supplying the discharged material to the ribbon mixer 41.

Figure 4:
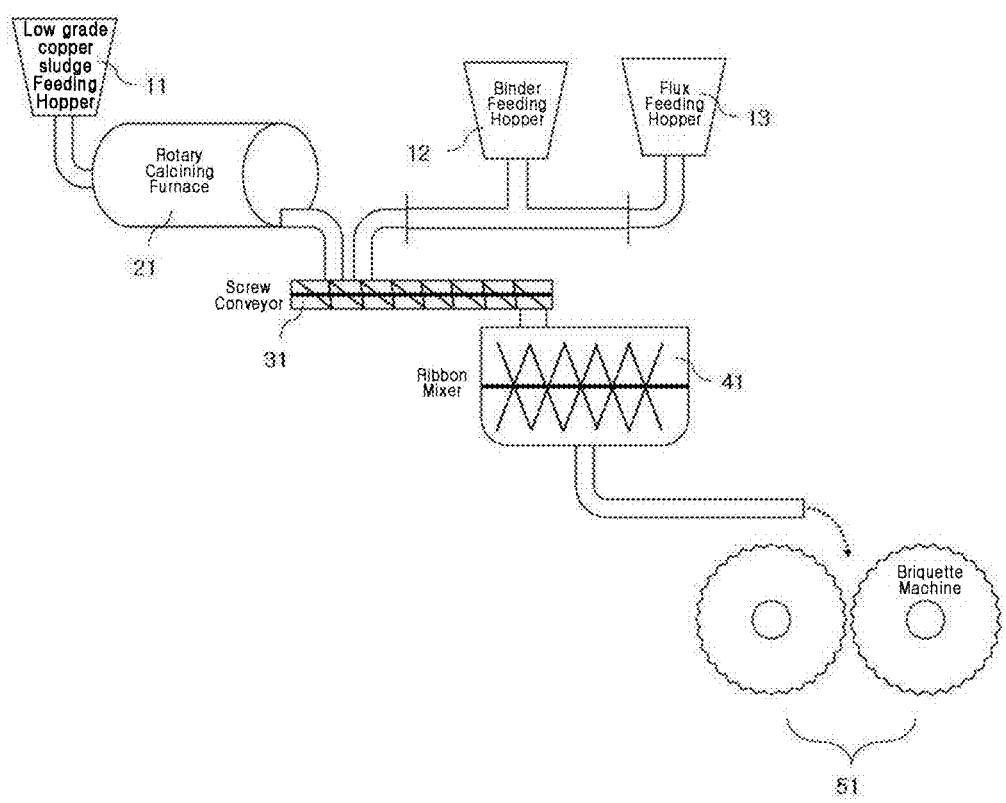
FIG. 4 is a mimetic diagram schematically showing an apparatus for manufacturing a briquette of a manufacturing method of crude copper from low-grade copper sludge according to an embodiment of the present invention.

The shape of the screw conveyor 31 may be a screw shape as shown in FIG. 4, but it is not limited thereto as long as it can effectively transmit the discharged material.

The low grade copper sludge feeding hopper 11 can communicate with the rotary calcining furnace 21 to supply the low-grade copper sludge for the rotary calcining furnace 21.

The rotary calcining furnace 21 is capable of calcining a low-grade copper sludge that received from the sludge hopper 11 at the temperature of 350° C. to 550° C., preferably in range of 400° C. to 500° C. If calcining temperature is less than 350° C., there is a possibility that the organic matter contained in a low-level copper sludge may not be effectively removed. If calcining temperature is higher than 550° C., excessive energy may be wasted in the removal of the organic matter that may be contained in a low-grade copper sludge.

The calcining time when the low-grade copper sludge is introduced to the rotary calcining furnace 21 may be in range of 1 hour to 4 hours, preferably in range of 2 hours to 3 hours. If calcining time is less than 1 hour, a problem may arise that the organic matter remains in the calcined low-grade copper sludge. If the calcining time exceeds 4 hours, excessive energy may be wasted in the removal of the organic matter that may be contained in the low-grade copper sludge.

The binder feeding hopper 12 may supply binder to the ribbon mixer 41. The flux feeding hopper 13 may supply flux to the ribbon mixer 41.

The binder may comprise one selected from a group consisting of molasses, starch, bentonite, water glass, and combinations thereof. Preferably, a binder containing bentonite or water glass can be used.

The flux may include one selected from a group consisting of calcium oxide, silica, and combinations thereof.

The low grade copper sludge feeding hopper 11, the binder feeding hopper 12, and the flux feeding hopper 13 can adjust a supply amount so that the weight ratio of the low grade copper sludge feeding hopper 11, the binder feeding hopper 12, and the flux feeding hopper 13 reaches a target weight ratio. The supply amount may be adjusted so that the weight ratio of the copper sludge to the binder is 100:1 to 10, and preferably the supply amount can be adjusted so that the weight ratio of the copper sludge to the binder is 100:3 to 7. If the weight ratio of the copper sludge to the binder is less than 100:1, compression molding of the compression portion may not be performed effectively. If the weight ratio of the copper sludge to the binder is more than 100:10, the cost of energy consumption per unit weight of the raw material of the sludge is reduced during the melting and reducing, and the amount of the raw material may be decreased compared with the amount of increase in binder usage when manufacturing a briquette.

The binder feeding hopper 12 or the flux feeding hopper 13 may further include water which is supplied to the ribbon mixer 41. The weight ratio of the copper sludge to water may be 100:1 to 10, and preferably the weight ratio of the copper sludge to water is 100:3 to 7. By including water on the above range, it is possible to improve the formability in compression molding in the compression portion.

The ribbon mixer 41 may be a ribbon mixer that is operated by a helical impeller. Stirring can be performed in low-grade copper sludge discharged from the rotary calcining furnace 21 through the mixer, the binder supplied from the binder feeding hopper 12 and the flux supplied from the flux feeding hopper 13.

The stirring may be performed for 0.5 to 3 hours, preferably for 1 to 1.5 hours. If the stirring is performed for less than 0.5 hour, there is a possibility that the low-grade copper sludge, binder, flux, and the like are not mixed uniformly. And if the stirring is performed for more than 3 hours, excessive energy wastage may occur in mixing uniformly the low-grade copper sludge, binder, flux and the like.

The compression portion 51 may be composed of two rollers provided at predetermined separation, and the surface of the roller may be in the form of a toothed wheel, but is not limited thereto. The material discharged from the ribbon mixer 41 can be compression-molded while being supplied to a space between the pair of rollers of the compression portion 51.

A plurality of the compression portion 51 may be provided in series so that the material discharged through the compression portion is compressed again.

It is possible to manufacture briquette which can be supplied to the submerged arc furnace (SAF) through the compression portion 51 resultingly.

Hereinafter, the present invention will be described in more detail with reference to production examples, examples of embodiments, and experimental examples. However, the following production examples, exemplary embodiments, and experimental examples are for illustrative purposes only and are not intended to limit the scope of the present invention.

<Production Example 1> Production of Low-Grade Copper Sludge Briquette

Step 1: 5,000 g of low-grade copper sludge was prepared which is containing 20.08 wt % of copper; 21.89 wt % of Iron; 3.89 wt % of calcium; 500 ppm of silver; 50 ppm of gold; 24 ppm of Platinum; 24 ppm of Palladium; the remaining water and the remaining amount of organic matter. The sludge was charged into a rotary calcining furnace and calcined at 450° C. for 2 hours.

Step 2: The binder was supplied to the mixer so that the weight ratio of the calcined low-grade copper sludge to bentonite was 100:5.54.

Water was supplied to the mixer so that the weight ratio of the calcined low-grade copper sludge to water was 100:5.54.

After a mixture of the low-grade copper sludge, binder and water was supplied, a mixture was stirred for 1 hour of the mixer operation.

Step 3: The mixture stirred in the mixer was fed to a compression portion to produce a low-grade copper briquette compressed and molded.

<Exemplary Embodiment 1> Crude Copper Production From Low-Grade Copper Sludge

The briquette is prepared which is provided in Production Example 1.

Step 4: The briquette was charged into a submerged arc furnace (SAF), and Silica and calcium oxide were added to the slag during melting and reducing so that the composition of the slag was 47 wt % of iron oxide (FeO), Silica ($SiO_2$) 35.3 wt %, and 17.7 wt % of calcium oxide (CaO). And then it was melted and reduced at a temperature of 1300° C. through a carbon electrode of a submerged arc furnace.

Step 5: The crude copper and slag produced in melting and reducing were separated by skimming to produce 1000 g of crude copper.

<Experimental Example 1> Analysis of the Content of Low-Grade Sludge Before and After Calcining and the Content After Producing Briquette The content of each component before and after calcining in step 1 of Production Example 1, the content of the mixture in the step 2, and the content of the briquette produced were measured, and the results are shown in Tables 1 to 2.

TABLE 1

| division | Q'ty (g/batch) | Cu wt % | Cu g | Fe wt % | Fe g | Ca wt % | Ca g | Ag ppm | Ag g | Au ppm | Au g |
|---|---|---|---|---|---|---|---|---|---|---|---|
| input | | | | | | | | | | | |
| Low-grade copper sludge | 5000 | 20.08 | 1004 | 21.89 | 1095 | 3.89 | 194.7 | 500 | 2.5 | 50 | 0.25 |
| TOTAL | 5000 | | 1004 | | 1095 | | 194.7 | | 2.5 | | 0.25 |
| output | | | | | | | | | | | |
| Low-grade copper sludge | 3250 | 30.89 | 1004 | 33.68 | 1095 | 5.99 | 194.7 | 769 | 2.5 | 77 | 0.25 |
| Gas | 1750 | | | | | | | | | | |
| TOTAL | 3250 | | 1004 | | 1095 | | 194.7 | | 2.5 | | 0.25 |

| division | Pt ppm | Pt g | Pd ppm | Pd g | Water + organic matter wt % | Water + organic matter g | Etc. wt % | Etc. g |
|---|---|---|---|---|---|---|---|---|
| input | | | | | | | | |
| Low-grade copper sludge | 24 | 0.12 | 24 | 0.12 | 35 | 1750 | 19.08 | 953.8 |
| TOTAL | | 0.12 | | 0.12 | | 1750 | | 953.8 |
| output | | | | | | | | |
| Low-grade copper sludge | 37 | 0.12 | 37 | 0.12 | | | 29.35 | 953.8 |
| Gas | | | | | | 1750 | | |
| TOTAL | | 0.12 | | 0.12 | | 1750 | | 953.8 |

TABLE 2

| division | (g/batch) Q'ty | Cu wt % | Cu g | Fe wt % | Fe g | Ca wt % | Ca g | Ag ppm | Ag g | Au ppm | Au g |
|---|---|---|---|---|---|---|---|---|---|---|---|
| input | | | | | | | | | | | |
| Low-grade copper sludge | 3250 | 30.89 | 1004 | 33.68 | 1095 | 5.99 | 194.7 | 769 | 2.5 | 77 | 0.25 |
| Binder | 180 | | | | | | | | | | |
| water | 180 | | | | | | | | | | |
| TOTAL | 3610 | | 1004 | | 1095 | | 194.7 | | 2.5 | | 0.25 |
| output | | | | | | | | | | | |
| Briquette | 3610 | 27.81 | 1004 | 30.32 | 1095 | 5.39 | 194.7 | 693 | 2.5 | 69 | 0.25 |
| TOTAL | 3610 | | 1004 | | 1095 | | 194.7 | | 2.5 | | 0.25 |

| division | Pt ppm | Pt g | Pd ppm | Pd g | water wt % | water g | binder wt % | binder g | Etc. wt % | Etc. g |
|---|---|---|---|---|---|---|---|---|---|---|
| input | | | | | | | | | | |
| Low-grade copper sludge | 37 | 0.12 | 37 | 0.12 | | | | | 29.35 | 953.8 |
| Binder | | | | | | | 180 | | | |
| water | | | | | 180 | | | | | |
| TOTAL | | 0.12 | | 0.12 | | 180 | | 180 | | 953.8 |
| output | | | | | | | | | | |
| Briquette | 33 | 0.12 | 33 | 0.12 | 4.99 | 180 | 4.99 | 180 | 26.42 | 953.8 |
| TOTAL | | 0.12 | | 0.12 | | 180 | | 180 | | 953.8 |

As shown in Table 1, when comparing the content of low-grade copper sludge before and after injecting into the calcining furnace, it was confirmed that 35 wt % of organic matter and water were removed from the total low-grade sludge after calcinging and the resulting gas was generated.

As shown in Table 2, the content of the low-grade copper sludge and the briquette after the introduction of the mixer were compared. The briquette produced after adding binder and water showed a copper content of 27.81 wt %, and the content of other valuable metals were also increased compared to the low-grade copper sludge at the time of initial introduction.

<Experimental Example 2> Analysis of the Content of Manufactured Crude Copper

The content of each raw material injected to the submerged arc furnace, and the content of crude copper and slag produced were measured in Exemplary Embodiment 1, and the results are shown in Table 3.

TABLE 3

| division | (g/batch) Q'ty | Cu wt % | Cu g | FeO wt % | FeO g | CaO wt % | CaO g | Ag ppm | Ag g | Au ppm | Au g |
|---|---|---|---|---|---|---|---|---|---|---|---|
| input | | | | | | | | | | | |
| Briquette | 3610 | 27.81 | 1004 | 39.01 | 1408 | 7.54 | 272 | 693 | 2.5 | 69 | 0.25 |
| Silica | 1070 | | | | | | | | | | |
| Calcium oxide | 270 | | | | | 96 | 259 | | | | |
| TOTAL | 4950 | | 1004 | | 1408 | | 531 | | 2.5 | | 0.25 |
| output | | | | | | | | | | | |
| Crude copper | 1024 | 98 | 1004 | 0 | | 0 | | 2440 | 2.5 | 244 | 0.25 |
| Slag | 2999 | | | 46.96 | 1408 | 17.72 | 531 | | | | |
| TOTAL | 4023 | | 1004 | | 1408 | | 531 | | 2.5 | | 0.25 |

TABLE 3-continued

| division | Pt ppm | Pt g | Pd ppm | Pd g | water wt % | water g | SiO₂ wt % | SiO₂ g | Etc. wt % | Etc. g |
|---|---|---|---|---|---|---|---|---|---|---|
| input | | | | | | | | | | |
| Briquette | 33 | 0.12 | 33 | 0.12 | 4.99 | 180 | | | 20.57 | 742.5 |
| Silica | | | | | | | 99 | 1059 | 1 | 10.7 |
| Calcium oxide | | | | | | | | | 4 | 10.8 |
| TOTAL | | 0.12 | | 0.12 | | 180 | | 1059 | | 764 |
| output | | | | | | | | | | |
| Crude copper | 117 | 0.12 | 117 | 0.12 | 0 | | 0 | | 0 | |
| Slag | | | | | | | 35.32 | 1059 | | |
| TOTAL | | 0.12 | | 0.12 | | | | 1059 | | |

As shown in Table 3, it was confirmed that the copper oxide included in a briquette can be reduced to copper molten metal, and the remaining valuable metals can be cast into crude copper by being dissolved in copper melt. In addition, it was confirmed that impure components such as iron in the briquette material were removed by slagging.

Through the process of using 5000 g of low-grade copper sludge, manufacturing of calcining, mixing, and briquetting and the melting and reducing at high-temperature in submerged arc furnace (SAF), and then a crude copper was manufactured. When 5000 g of low-grade copper sludge was injected, 1000 g of crude copper was obtained, and it was found that crude copper contained 98 wt % of copper, 244 ppm of Au, and 2440 ppm of Ag as a result of the analysis.

The crude copper containing the valuable metal can be separated and purified by a wet smelting process. In other words, when copper is refined and electrolyzed, high-purity copper can be obtained and slime containing a valuable metal can be obtained. The slime containing the valuable metal can be separated and purified from the valuable metals such as silver and gold through a wet leaching process.

Although the present invention has been described with respect to a method for manufacturing a crude copper sludge from a low-grade copper sludge, various modifications may be made without departing from the scope of the present invention.

While the present invention has been particularly shown and described with reference to exemplary embodiments thereof, it is evident that many alternatives, modifications and variations will be apparent to those skilled in the art. It will be understood by those skilled in the art that various changes in form and details may be made therein without departing from the spirit and scope of the invention as defined by the appended claims.

In addition, since the present invention can be embodied in various forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

What is claimed is:

1. A manufacturing method of crude copper from low-grade copper sludge, comprising the steps of:
   calcining a low-grade copper sludge which comprises iron (step 1);
   producing a mixture by adding a binder and optionally a first flux to the calcined low-grade copper sludge (step 2);
   producing a briquette by compression molding the mixture (step 3);
   melting and reducing by charging the briquette into a submerged arc furnace with adding second flux which comprises silica and calcium oxide (step 4); and
   separating crude copper and slag produced by the melting and reducing (step 5),
   wherein the second flux is added in step 4 so as to form a slag comprising:
     iron oxide (FeO) in a range of 40 wt % to 57 wt %;
     silica (SiO₂) in a range of 33 wt % to 37 wt %; and
     calcium oxide (CaO) in a range of 10 wt % to 23 wt %, and
   the binder in step 2 comprising bentonite.

2. The method of claim 1,
   wherein the low-grade copper sludge in step 1 has a copper content of 5 wt % to 25 wt %.

3. The method of claim 1,
   wherein the calcining temperature in step 1 is from 350° C. to 550° C.

4. The method of claim 1,
   wherein the first and second flux in step 2 and step 4 comprises one selected from a group consisting of calcium oxide, silica, and combinations thereof.

5. The method of claim 1,
   wherein the addition in step 2 is carried out so that the weight ratio of the copper sludge to the binder is 100:1 to 10.

6. The method of claim 1,
   wherein the mixture in step 2 further comprises water, wherein the weight ratio of the copper sludge to water is from 100:1 to 10.

7. The method of claim 1,
   wherein the melting and reducing in step 4 is performed at a temperature of 1300° C. to 1500° C.

* * * * *